US006861615B2

(12) United States Patent
Wojcik et al.

(10) Patent No.: US 6,861,615 B2
(45) Date of Patent: Mar. 1, 2005

(54) METHOD AND SYSTEM FOR CUTTING CORES WITH A LASER

(75) Inventors: Steven J. Wojcik, Little Chute, WI (US); Nathan C. Harris, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 126 days.

(21) Appl. No.: 10/325,685

(22) Filed: Dec. 20, 2002

(65) Prior Publication Data

US 2004/0118820 A1 Jun. 24, 2004

(51) Int. Cl.[7] .............................................. B23K 26/38
(52) U.S. Cl. ............................ 219/121.67; 219/121.72
(58) Field of Search ..................... 219/121.6, 121.67, 219/121.68, 121.69, 121.7, 121.71, 121.72, 121.82, 121.83, 121.85

(56) References Cited

U.S. PATENT DOCUMENTS

| | | | |
|---|---|---|---|
| 2,769,600 A | | 11/1956 | Kwitek et al. |
| 3,965,327 A | | 6/1976 | Ehlscheid et al. |
| 4,049,945 A | | 9/1977 | Ehlscheid et al. |
| 4,317,021 A | * | 2/1982 | Walch et al. .......... 219/121.67 |
| 4,430,548 A | | 2/1984 | Macken |
| 4,636,608 A | * | 1/1987 | Palentyn et al. ....... 219/121.72 |
| 4,645,900 A | | 2/1987 | Heyden |
| 5,213,649 A | | 5/1993 | Sepavich et al. |
| 5,767,481 A | | 6/1998 | Graf |
| 5,994,667 A | * | 11/1999 | Merdan et al. ........ 219/121.67 |
| 6,191,382 B1 | | 2/2001 | Damikolas |
| 6,335,508 B1 | * | 1/2002 | Nam ...................... 219/121.67 |
| 6,522,941 B1 | * | 2/2003 | Tashiro et al. .............. 700/180 |

FOREIGN PATENT DOCUMENTS

| | | |
|---|---|---|
| DE | 42 19 431 A1 * | 1/1994 |
| EP | 0516199 A1 | 12/1992 |
| GB | 1040768 | 9/1966 |
| JP | 59194966 A | 11/1984 |
| JP | 59194967 A | 11/1984 |
| JP | 63063591 A | 3/1988 |
| JP | 63307030 A | 12/1988 |
| JP | 05123880 A | 5/1993 |
| JP | 06031698 A2 | 2/1994 |
| JP | 06206651 A | 7/1994 |
| JP | 09094685 A | 4/1997 |
| JP | 2000143046 A | 5/2000 |

OTHER PUBLICATIONS

Translation of DE 4219431 A1, filed Jan. 5, 1994.
Patent Abstracts of Japan Publication No. 2000143046 A, May 23, 2000.
Patent Abstracts of Japan Publication No. 63307030 A, Dec. 14, 1988.
Patent Abstracts of Japan Publication No. 63063591 A, Mar. 19, 1988.
Publication Abstracts of Japan Publication No. 59194967 A, Nov. 5, 1984.
Patent Abstracts of Japan Publication No. 59194966 A, Nov. 5, 1984.
Patent Abstracts of Japan Publication No. 09094685 A, Apr. 8, 1997.
Patent Abstracts of Japan Publication No. 06206651 A, Jul. 26, 1994.
Patent Abstracts of Japan Publication No. 06031698 A2, Feb. 8, 1994.
Patent Abstracts of Japan Publication No. 05123880 A, May 21, 1993.
PCT Search Report, Nov. 2, 2004.

* cited by examiner

*Primary Examiner*—Samuel M. Heinrich
(74) *Attorney, Agent, or Firm*—Dority & Manning, P.A.

(57) ABSTRACT

A system for cutting cores used to wind up web materials or as a base structure for containers and other devices is provided. The system uses a core guidance tube in one aspect to position a continuously forming core while a laser beam is directed at the core to cut the core into desired lengths. A method for using the system is further provided.

32 Claims, 6 Drawing Sheets

METHOD AND SYSTEM FOR CUTTING CORES WITH A LASER

BACKGROUND OF THE INVENTION

In a machine for making or processing rolled web products, high-bulk rolled web products can adversely affect a cycle-rate capability of the machine. For instance, as roll bulks increase, rolled web product sheet counts, conversion process efficiencies, and a general throughput capability of the machine correspondingly decrease. Ironically, these decreases demand increased cycle-rates.

Improvements in machine cycle-rates are hampered in one respect by a conventional core production process. Cores are produced, for instance, to wind up the rolled web products. However, cutter assemblies used to cut the cores to specific sizes have reached the limits of known technology. The typical cutter assembly uses saw blades and slitters that limit core production speed and efficiency and thus limit machine cycle-rates.

A core is usually formed on a winding mandrel from unwind stations known as "unwinds". The core is often made of paper, paperboard, cardboard, and other windable materials. The unwinds unwind webs of the windable material onto a winding mandrel to form the core. Typically, glue is applied to one or more webs of the windable material, which are helically wound by a winding mandrel to form a continuous core. A downstream cutter assembly cuts the continuous core to specific lengths.

One type of a cutter assembly is known to include a knife or saw blade disposed on a track assembly. The saw blade is positioned on the track assembly to directly contact the continuous core. The core is cut as the saw blade is moved across a circumferential surface of the core. A problem with this type of mechanical cutter assembly is that the saw blade becomes worn and dull over time. In addition to forming undesirable paper lint and dust, a dull saw blade eventually causes the core to be torn apart, rather than to be cut cleanly.

Torn cores also occur when the saw blade lags behind or does not match the speed of the core. A drop in saw blade speed could occur due to a drop in air pressure in a mill or due to mechanical problems associated with bearings and cam followers in known cutter assemblies. Moreover, torn cores result from faulty glue application during the core winding stage. Faulty glue application is caused by insufficient application of glue, missed areas in the overlap area of the windable material, and/or inconsistent glue absorption of the windable material. A water drop or absorption rate of the windable material, or a change in the glue viscosity can render the glue at least partially ineffective. When the dull saw blade catches an ineffective glue seam in the overlap area, the core is torn and edges of the glued core are "kicked up."

Torn cores exhibit what are termed in the industry as "pulled ears," tails, or flags. Whether caused by mechanical problems associated with conventional cutter assemblies, or due to faulty glue applications, pulled ears cause significant problems in a downstream machine direction. For instance, as a core is rotating at high speed and begins to wind up a sheet of the rolled web product, a pulled ear on the core can tear out the sheet and force a machine stoppage.

In an effort to prevent pulled ears, large amounts of glue are now applied to entire surfaces of the windable material before the material is wound on the winding mandrel. This approach may prevent some pulled ears but it uses more glue than is desirable. Excessive glue application is costly and creates clean-up problems in the winding mandrel and further downstream.

A cutter assembly for cutting cores that is not susceptible to mechanical wear at the cutting point, which does not require machine downtime to clean up excess glue, and which results in a relatively smooth cut edge that is free of lint, dust, and pulled ears is needed.

BRIEF SUMMARY OF THE INVENTION

The present invention provides a method and system of cutting cores. The cores are used as containers, base structures, or for rolling up rolled web products. The cores are made of paper, paperboard, cardboard, plastic, or any windable material suitable as containers, for winding up the rolled web products, or the like. The rolled web products include tissues, paper towels, industrial wipers, laboratory wipers, wet wipes, non-woven polymer materials, air-laid materials, wet materials, dry materials, disposable materials, nondisposable materials, treated materials, metallic materials and the like. The tissues include facial tissues or bath tissues, for instance, which are made predominantly of pulp fibers and can be creped or uncreped. For example, the tissues can be formed from a web creped from a Yankee dryer. Alternatively, the tissues can be an uncreped, through-air-dried (TAD) fabric.

One embodiment of the present invention includes a laser, a beam delivery system, a linear motor, and a core guidance tube. The core guidance tube supports and guides the core while the beam delivery system redirects and focuses the laser beam onto the core to cut the core. The linear motor is used to move the beam delivery system to cut the core, which is continuously moving in a machine direction. Advantageously, the core is cut cleanly without mechanical contact.

In another embodiment of the invention, a method is provided for cutting the core using a laser and a laser beam delivery system. Steps of this method include moving the laser beam delivery system in a machine direction substantially parallel to a moving core. The laser beam delivery system redirects and focuses the laser beam to cut the moving core without mechanically contacting the core.

According to the present invention, cutting the cores with a laser instead of mechanical devices reduces flags or pulled ears, prevents excessive machine downtime, and reduces glue usage by as much as 75%. For instance, instead of excessively coating large areas of the core material with glue before the core material is rolled into a core in an attempt to prevent pulled ears, the glue is applied as a narrow, focused ribbon. The ribbon of glue is applied to one or more parts of core material, which are helically wound to create glued edges or connecting junctures. The laser will cut cleanly through these junctures. In contrast, a known saw blade can "kick up" an edge of the juncture and cause the machine to jam.

Other aspects and features of the invention will be apparent from the following description and the attached drawings or can be learned through practice of the invention.

BRIEF DESCRIPTION OF THE DRAWINGS

The above and other aspects of the present invention are apparent from the detailed description below and in combination with the drawings in which.

DETAILED DESCRIPTION OF THE DRAWINGS

Figure 1:
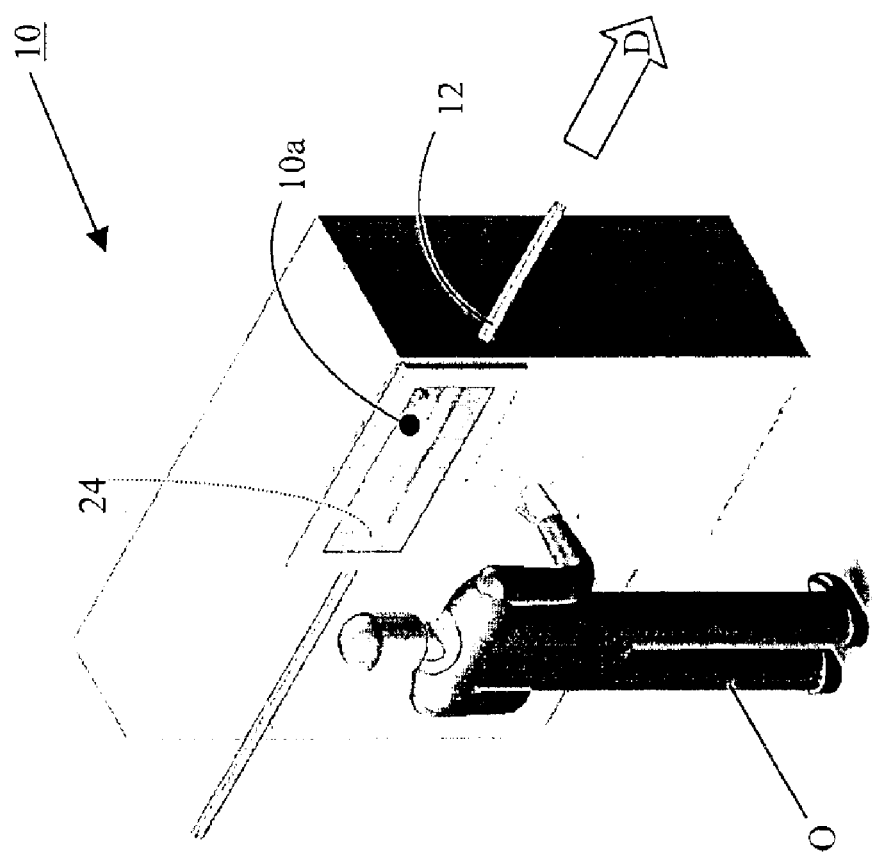
FIG. 1 is a perspective view of a laser core cutting system in accordance with an aspect of the invention.

Detailed reference will now be made to the drawings in which examples embodying the present invention are shown. The drawings and detailed description provide a full and detailed written description of the invention and of the manner and process of making and using it, so as to enable one skilled in the pertinent art to make and use it. The drawings and detailed description also provide the best mode of carrying out the invention. However, the examples set forth herein are provided by way of explanation of the invention and are not meant as limitations of the invention. The present invention thus includes modifications and variations of the following examples as come within the scope of the appended claims and their equivalents.

Repeat use of reference characters in the present specification and drawings is intended to represent same or analogous features or elements of the invention.

In general the present invention is directed to a laser core cutting system that utilizes a laser to cut a helically wound object such as a core. The core is made of paper, paperboard, cardboard, plastic, or any windable material suitable for winding up tissues, paper towels, industrial wipers, laboratory wipers, wet wipes, non-woven polymer materials, air-laid materials, wet materials, dry materials, disposable materials, nondisposable materials, treated materials, metallic materials and the like. Further, the core can be used as a container for shipping and mailing items, or as a base structure such as for model rockets, or for packaging foodstuffs, feminine care products, blueprints, maps, charts, and other assorted items.

The laser core cutting system of the present invention avoids mechanical wear at a cutting point on the core material by eliminating a mechanical cutting mechanism. Thus, the laser core cutting system provides a relatively smooth cut edge on the core, free of lint, dust, and pulled ears. As described in greater detail below, the laser core cutting system also reduces machine downtime required to clean up excess glue and remove downstream obstructions caused by pulled ears.

As broadly embodied in the Figures, a laser core cutting system 10 for cutting a core 12 is provided in accordance with one embodiment of the present invention. It should be understood, however, that various other arrangements of the laser core cutting system 10 can be made in accordance with the present invention. For instance, a plurality of the laser core cutting systems can be arranged in series or in parallel to accommodate multiple lines of continuous cores 12.

Referring to FIG. 1, the laser core cutting system 10 has a viewing window 10a through which an operator O can monitor operation of the laser core cutting system 10. The viewing window 10a is constructed of a known safety glass or a Plexiglas®-type material that is resistant to physical impact and has optical qualities that protect the vision of the operator O. Viewing windows are known and further details are not necessary to appreciate this aspect of the invention.

Figure 2:
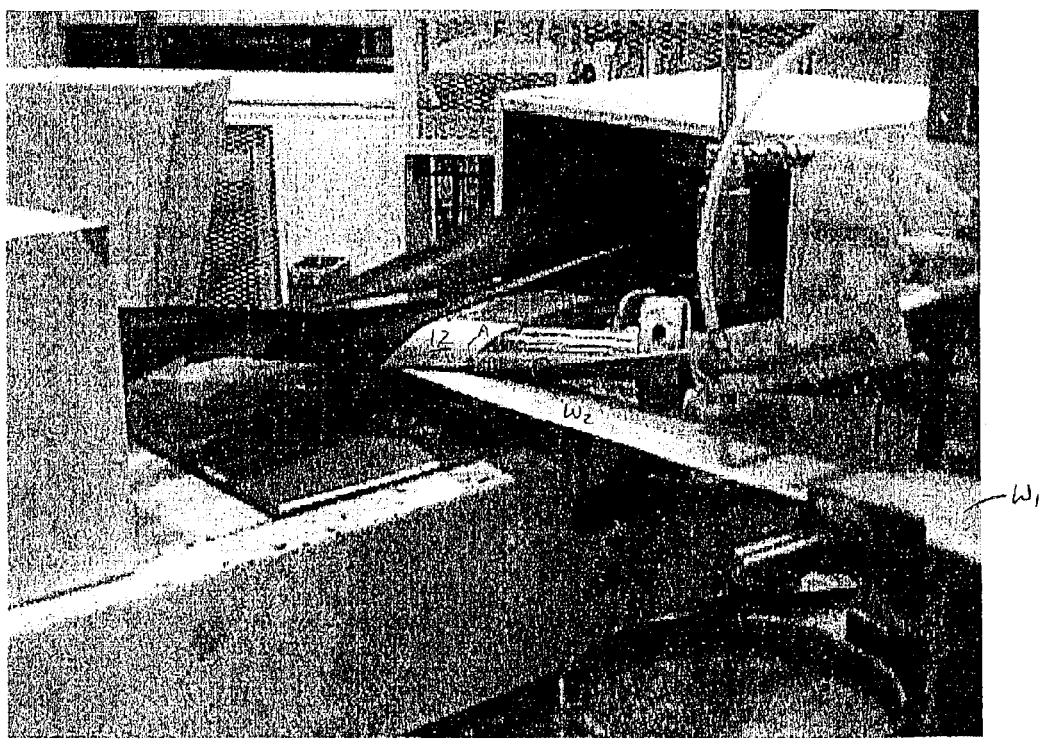
FIG. 2 is a perspective view of a core being formed in accordance with another aspect of the invention.
Figure 2:

With reference to both FIGS. 1 and 2, the continuous core 12 is shown being formed and guided by a core guidance tube 24 in a machine (translational) direction D. The core guidance tube 24 receives the core 12 from an upstream winding mandrel 16 and positions the core 12 for cutting by the laser core cutting system 10. FIG. 2 particularly shows the upstream winding mandrel 16 helically winding two webs $W_1$, $W_2$ of windable material to form the core 12. More specifically, the core 12 is formed on the winding mandrel 16 from two or more conventional unwind stations or "unwinds" (not shown) in which the webs $W_1$, $W_2$ are unwound from parent rolls (not shown) to the winding mandrel 16. The webs $W_1$, $W_2$ enter the winding mandrel 16 at the same angle to form the helically wound core 12, although various entry angles can be arranged to wind-up nonstandard or custom wound cores. It is also to be understood that any number of webs of windable material can be used to form single-ply or multi-ply cores 12; thus, the invention is not limited to the exemplary webs $W_1$, $W_2$.

Also in the present example, the webs $W_1$, $W_2$ may be abutted or overlapped from between zero to about ¾ inch. A focused bead or ribbon of glue or other adhesive (not shown) is applied in an overlap or abutment area "A" of the webs $W_1$, $W_2$ to adhere the webs $W_1$, $W_2$ together. As the winding mandrel 16 helically winds the webs $W_1$, $W_2$ together, the continuous tube or core 12 is formed in the machine direction D to be severed by the laser 14 downstream, as described below.

Figure 3:
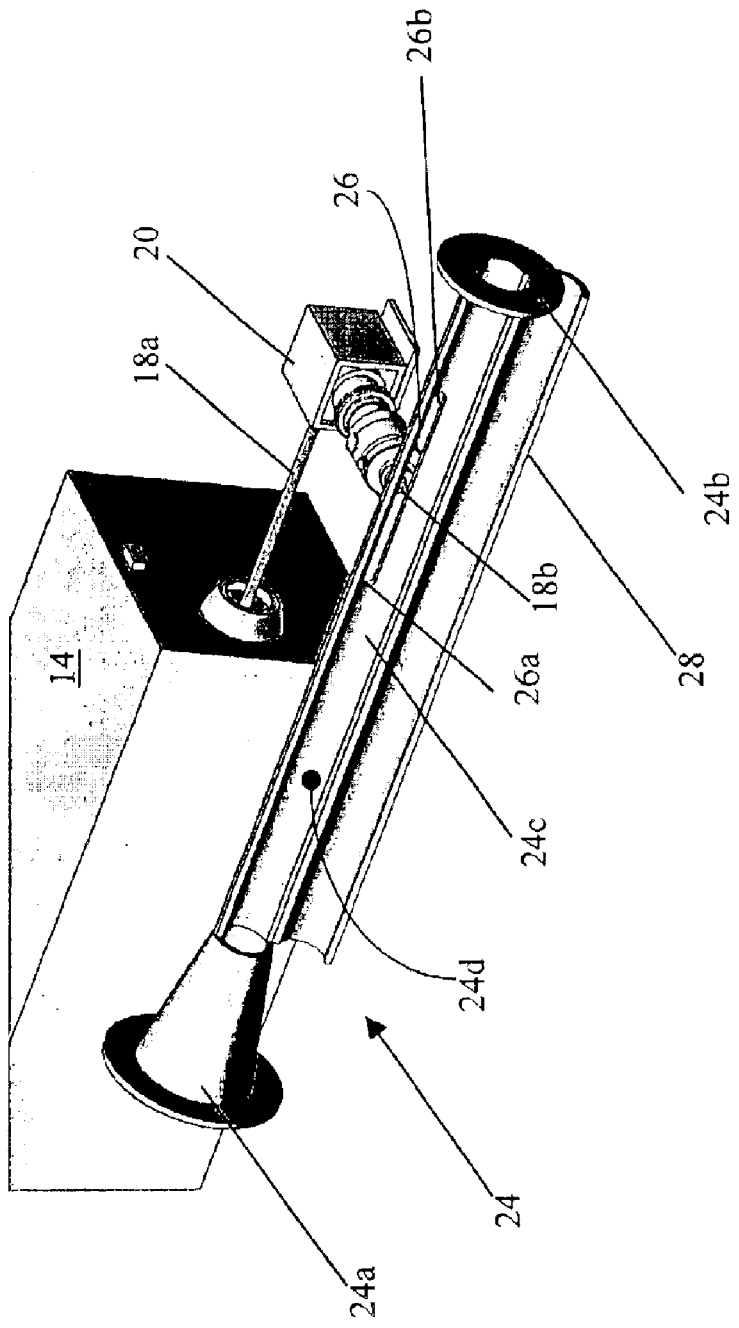
FIG. 3 is a partial perspective view of a laser and a core guidance tube in accordance with a further aspect of the invention.

As shown in FIG. 3, a laser 14 produces a laser beam 18a, which is directed toward the core guidance tube 24 and focused by a laser beam delivery system 20 in the form of a translated laser beam 18b. In this example, the core guidance tube 24 includes a receiving end 24a, an expulsion end 24b, a middle section 24c, an interior 24d, a slot 26, and an access panel 28. The receiving end 24a is fluted or funnel-shaped to guide the core 12 into the middle section 24c (compare FIG. 1). The slot 26, described in greater detail below, allows the laser beam 18b to circumferentially cut the core 12 to a desired length. The expulsion end 24b expulses a severed section of the core 12 after the translated laser beam 18b has made a cut C on the core 12 (see FIG. 4). After discharge from the expulsion end 24b, the severed section of the core 12 is removed from the laser core cutting system 10 by known blowers, gravity, discharge conveyors and the like. An exemplary operation of the laser 14, the laser beam delivery system 20 and the core guidance tube 24 is described in greater detail below.

The access panel 28 in this aspect of the invention is hingeably, swivably, removably, slidably, or otherwise attached to the core guidance tube 24. The access panel 28 permits an operator O to access the interior 24d of the core guidance tube 24 to clean the interior 24d, to remove a portion of the core 12, to perform maintenance on the core guidance tube 24, or to perform various other maintenance functions.

Figure 4:
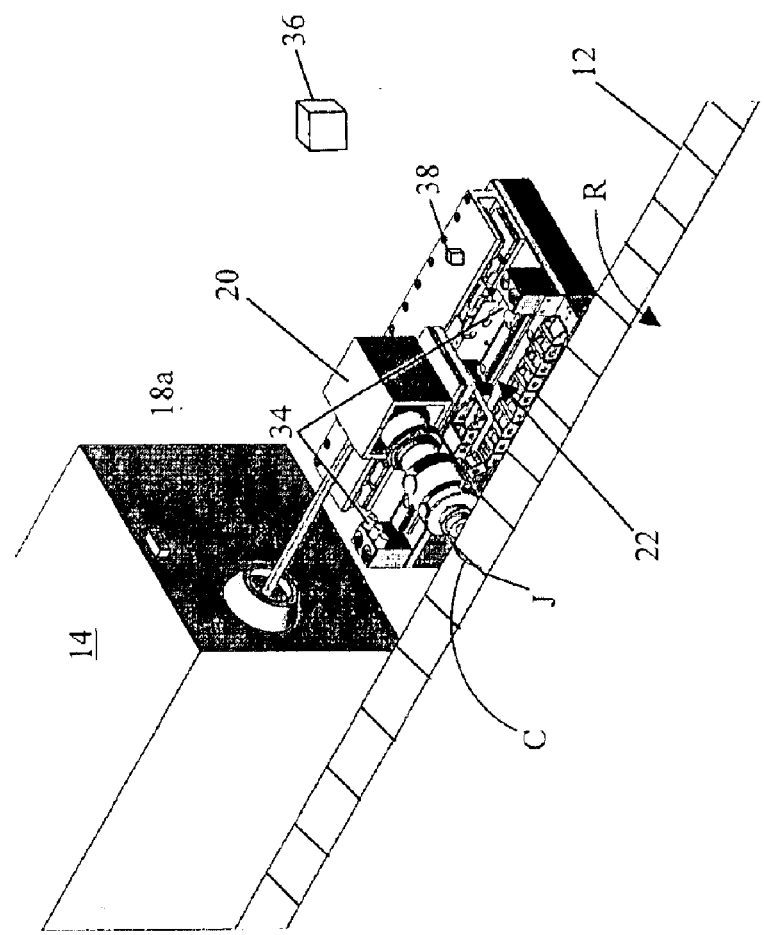
FIG. 4 is similar to FIG. 3, particularly illustrating the core with the core guidance tube removed for clarity.

Referring to both FIGS. 3 and 4, the laser 14 and the laser beam delivery system 20 are shown with the core guidance tube 24 removed. The core 12 is shown being cut by the translated laser beam 18b as the core 12 rotates in a direction indicated by an arrow R. In this example, the laser beam 18b is shown cutting cleanly through a glued juncture J on the core 12. As shown, the laser beam delivery system 20 is mounted on a linear motor 22, which moves parallel to the machine direction and the continuous core 12. The linear motor 22 in this example moves the laser beam delivery system 20 away from and toward the laser 14. As will be described in greater detail below, the linear motor 22 moves the laser beam delivery system 20 at a speed matching the translational speed of the core 12, which is continuously moving in the machine direction D. Therefore, as the core 12 rotates in the direction of arrow R, the core 12 is axially stationary relative to the laser beam 18b. Accordingly, the laser beam 18b makes the circumferential cut C in the core 12.

Figure 5:
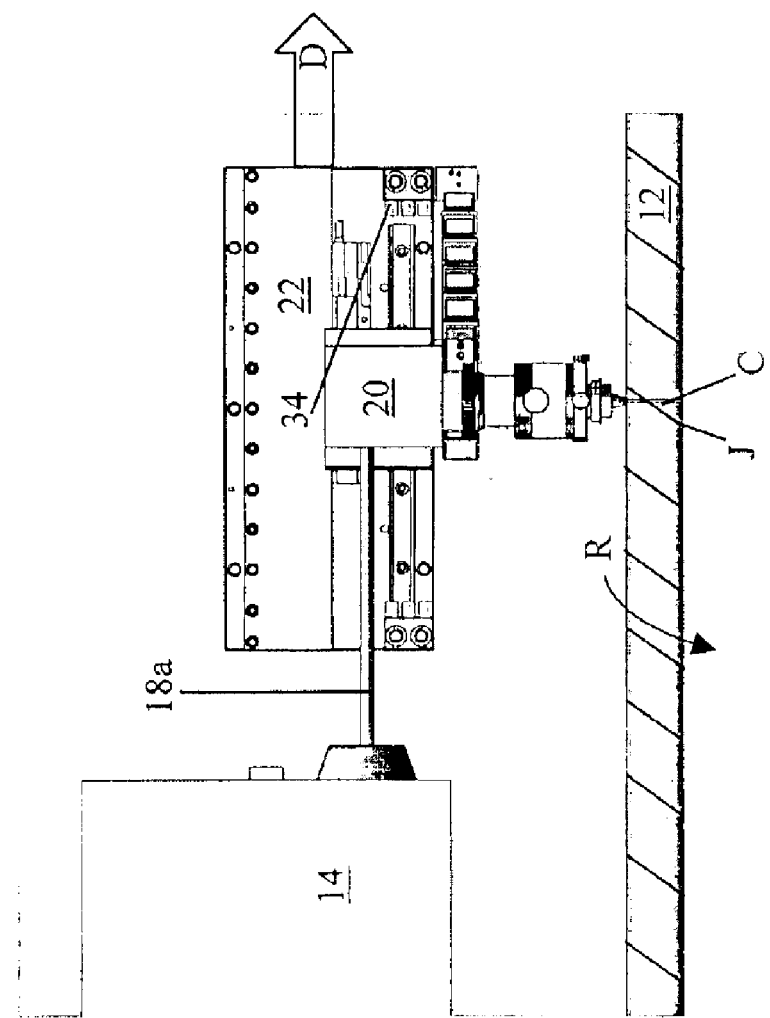
FIG. 5 is a top plan view of the embodiment as shown in FIG. 4.

FIG. 5 shows a top plan view of the embodiment as shown in FIG. 4. In this illustration, the linear motor 22 is moving substantially parallel to the core 12 along the track assembly 30 in the machine direction indicated by arrow D. Concurrently, the laser beam 18a is translated by the laser beam delivery system 20 into the laser beam 18b (see FIG. 6) to make the cut C on the core 12.

Figure 6:
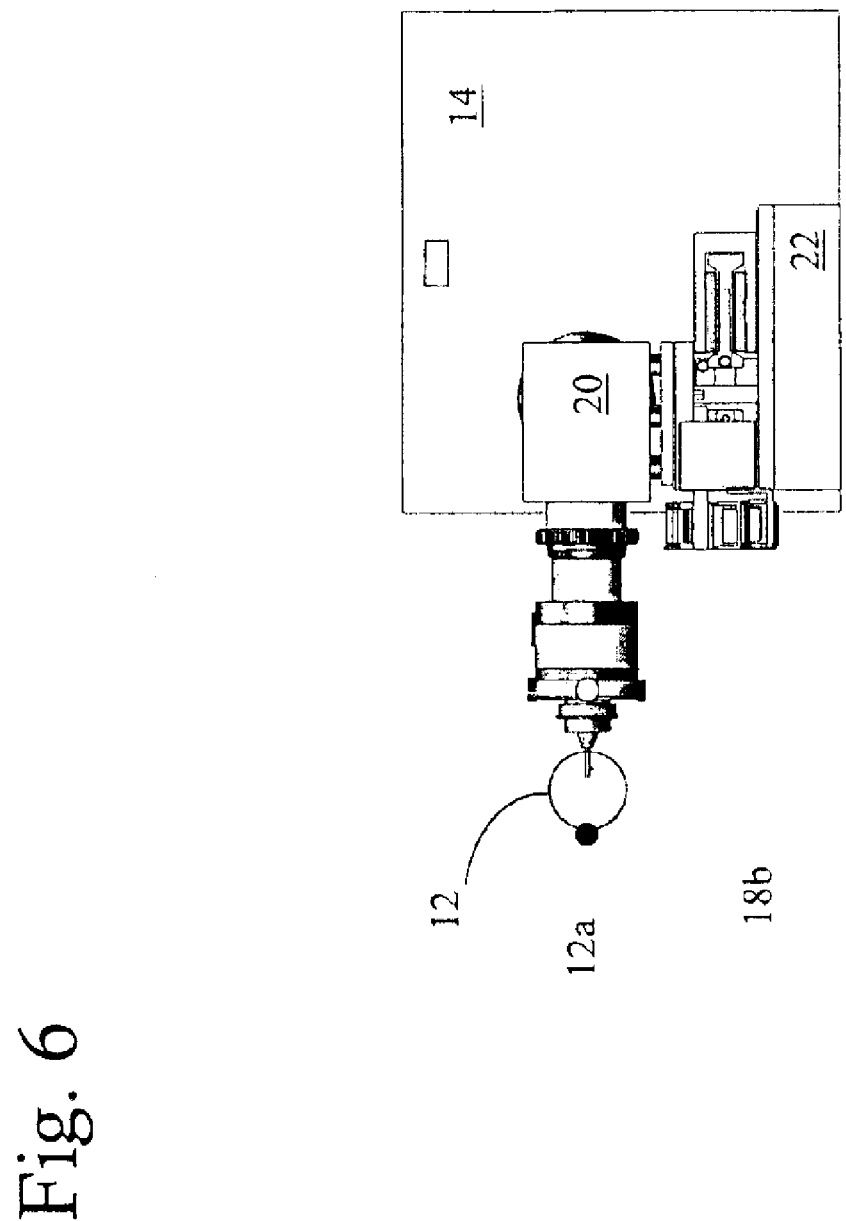
FIG. 6 is a side view of the embodiment as shown in FIG. 4.

In FIG. 6, a selectable core penetration power of the translated laser beam 18b is shown that enables the laser beam 18b to cut the core 12. In this example, the laser will cut the core 12 circumferentially as described above but will not over-penetrate the core 12 beyond a far side 12a of the core 12. More specifically, the laser 14 and the penetration power of its translated laser beam 18b are selected based on at least four criteria: 1) a rated power of the laser 14; 2) a basis weight of the windable material (e.g., webs $W_1$, $W_2$) that forms the core 12; 3) the translational and rotational speeds of the windable material; and 4) the number of desired plies in the finished core 12. For instance, a continuous wave (CW), carbon dioxide ($CO_2$) laser having an average power of 500 watts (W) may be suitable for cutting the paperboard or cardboard that forms the core 12.

An exemplary laser suitable for use as laser 14 is available from Coherent, Inc./DeMaria ElectroOptics Systems Inc. (DEOS), located in Bloomfield, Conn. Coherent/DEOS designs and manufactures the DIAMOND™ family of $CO_2$ lasers that are small enough to mount on a bench or a small machine but powerful enough to cut the windable materials that form the core 12. The DIAMOND™ laser family is maintenance free, completely sealed and requires no external gas, which makes it a highly reliable family of lasers. The DIAMOND™ laser family is available from 25 watts to 500 watts of average power (up to 3000 watts of peak power) with output wavelengths in the 10 and 9-micron regions. Available operating modes include CW, pulsed (i.e., intermittent or "pumped") or Q-switched (i.e., laser pulses of short duration and high peak power). Q-switching allows the generation of laser pulses from about 1 to about 50 nanoseconds and from less than 1 megawatt (mW) to about 50 mW. Q-switching derives its name by switching a laser cavity quality factor, or Q factor, from a low to a high value suddenly; i.e., by releasing stored laser energy in a short, intense light pulse. Additional information on Q-switching can be found in *Principles of Lasers*, Third Edition, by Professor Orazio Svelto, available from Plenum Press, New York.

By way of further example, the DIAMOND™ laser family provides a high intensity laser beam, which provides faster vaporization of non-metals such as cardboard and paperboard for the formation of the core 12. Moreover, the high intensity beam of the DIAMOND™ laser family produces a highly focused spot (0.075 millimeter (mm) diameter) that allows the 500-watt model generating 1500 peak power to produce instantaneous intensities of up to 0.3 $mW/mm^2$ at the core 12. This intensity is greater than many CW lasers of comparable power and provides for higher processing speeds of the laser 14.

It is to be noted that the DIAMOND™ laser family is provided by way of example only and is not intended to foreclose the use of other lasers as the laser 14. For example, although the $CO_2$ laser is an economical alternative, other gas lasers such Helium-Neon (He—Ne) or Argon (Ar) can be used. Likewise, liquid lasers, chemical lasers, semiconductor lasers, solid-state lasers (e.g., ruby or alexandrite crystal), and other lasers having various power outputs can be used for the laser 14. More specifically, various lasers may be suitable depending on increases in the thickness of the windable material $W_1$, $W_2$; the number of plies; and/or the translational and rotational speeds of the core 12. Under these circumstances, a higher wattage, Nd:YAG, solid-state laser can be used as the laser 14. The Nd:YAG is a Neodymium laser that utilizes an $Nd^{3+}$ion as its active material in a laser medium of $Y_2Al_5O_{12}$, or YAG, an acronym for yttrium aluminum garnet.

In accordance with a further aspect of the present invention, the laser beam delivery system 20 is attached to the linear motor 22 in any suitable manner to hold the laser beam delivery system 20 relatively stationary as the linear motor 22 moves in the machine direction (see arrow D in FIG. 5). As briefly introduced, the linear motor 22 moves the laser beam delivery system 20 substantially parallel to the continuous core 12.

Any linear motion system capable of attaching, supporting and moving the laser beam delivery system 20 to traverse a length of the core guidance tube 24 can be used in place of the linear motor 22. Examples of a linear motion system include but are not limited to a servo-driven belt drive, an electromagnetic servo-drive, a cam shaft/follower system, a linear actuator, a ball-screw drive, a servo-pneumatic drive or any other form of locomotion that provides a repetitive straight line or back-and-forth motion. By way of example but not of limitation, a Linear Servo Motor™ is available from Trilogy Systems located in Webster, Tex. The exemplary Linear Servo Motor™ is cost effective, simple in design and suitable as the linear motor 22 to accommodate the laser beam delivery system 20.

In an exemplary operation of the laser core cutting system 10, the core 12 is continuously, rotatingly formed from the winding mandrel 16 as introduced above. The core 12 enters the core guidance tube 24 via the receiving end 24a, which in this example is funnel-shaped to more easily receive a first end (not shown) of the continuous core 12. The interior 24d of the core guidance tube 24 defines a complementary-sized inside diameter (I.D.). The continuous core 12 defines an outside diameter (O.D.) of approximately 1 inch to about 2 inches, which is slightly smaller than the I.D of the core guidance tube 24. The core guidance tube 24 receives and guides the continuous core 12 in the machine direction (see FIG. 5, arrow D) and permits the laser beam 18b to circumferentially cut the continuous core 12 approximately 50 times per minute. Notwithstanding these examples, various O.D. and complementary I.D. sizes of respective cores 12 and core guidance tubes 24 can be provided, and more or less cores 12 can be cut per minute as required. Also, it is to be noted that the core guidance tube 24 is provided by way of example only and is not required for the present invention.

Referring again to FIGS. 3–6, the linear motion system is started, stopped and reversed by reaching a stop 34 and/or by receiving a control signal from a controller 36, such as a programmable logic computer, or from a proximity sensor 38 as seen in FIG. 4. The stop 34, controller 36, and/or the proximity sensor 38 are not required if, for instance, the linear motor 22 is utilized since the linear motor 22 is self-contained. In other words, the linear motor 22 is designed to move a required distance to achieve the circumferential cut C on the core 12 and then reverse direction. The length of the slot 26 is at least equal to the required distance.

By way of example, as the linear motor 22 is moving at the tanslational speed to match the translational speed of the core 12, the laser 14 lases for a period of time sufficient to complete the cut C about the circumference of the core 12. Stated another way, the laser 14 moves the required distance, which is at least equivalent to a ratio of the translational speed of the linear motor 22 and the core 12 divided by the rotational speed of the core 12 multiplied by the circumference of the core 12. In one aspect of the present invention, the linear motor 22 communicates with the laser 12 to deactivate the laser beam 18a once the linear motor 22 traverses the required distance, such as the length of the slot 26.

Additionally, the laser 14 may be designed in electronic communication with the controller 36 or proximity sensor 38 to deactivate the laser beam 18b and/or to reverse a movement of the laser beam delivery system 20. For instance, as an alternative linear motion system, previously described, nears the stop 34, the proximity sensor 38 senses the stop 34 and communicates with the controller 36 to reverse a movement of the alternative linear motion system in a direction opposite the arrow D. Alternatively, or in addition to the foregoing example, the controller 36 is programmed to deactivate the laser beam 18b after a pre-programmed distance.

Moreover, the linear motor 22 permits the laser beam delivery system 20 to match the translational speed of the core 12 moving in the machine direction (arrow D). The laser beam delivery system 20 is thus axially stationary to a point on the core 12. As briefly introduced, the axially stationary core 12 is also continuously rotating thus presenting the rotating circumferential surface to the translated laser beam 18b. Also described, the laser beam 18b lases the circumferential surface of the core 12 to make the cut C from the first end 26a to the after end 26b of the slot 26. Once the laser beam 18b reaches the after end 26b, the cut C is complete since the cut C is a function of the length of the slot 26.

In another aspect of the invention, a method for cutting a rolled product core includes the steps of:
Providing a continuously forming and rotating core 12 from an upstream core winder (not shown) in which the rotating core 12 is moving in a machine direction at a translational speed;
Generating a laser beam 18a;
Receiving the laser beam 18a and a laser beam delivery system 20 proximate the rotating core 12;
Moving the laser beam delivery system 20 in the machine direction at the translational speed such that the rotating core 12 is axially stationary relative to the laser beam delivery system 20; and
Directing the laser beam 18b at the rotating core 12 with the laser beam delivery system 20 to circumferentially sever the rotating core 12 with the laser beam 18b.

In the foregoing aspect, the laser beam delivery system 20 includes a reflector, a mirror, or other optical system (not shown) to redirect or translate the laser beam 18a in the form of laser beam 18b. Laser beam 18b is directed toward the core guidance tube 24 to crosscut the core 12 similar to the foregoing embodiment. The method may also include the sub-steps of deactivating the laser beam 18b at a sensed or pre-programmed point. The controller 36 or proximity sensor 38 similar to those described in the previous embodiment are provided to sense this point and to communicate the point to the laser 14 if another linear motion system is utilized other than the linear motor 22.

The method may further include the steps of discharging a section of the core 12 after it has been cut by the laser beam 18b from the expulsion end 24b of the core guidance tube 24. The discharged section of the core 12 can be removed from the core guidance tube 24 by a blower or air blast (not shown), a force of gravity, and/or a discharge conveyor (not shown) to send the discharged section of the core 12 upstream to wind up a rolled web product or to be used as a container or as a base structure for another product.

Those of ordinary skill in the art will appreciate that the foregoing descriptions are by way of example only, and are not intended to limit the invention as further described in the appended claims. Thus, it will be apparent to those skilled in the art that various modifications and variations can be made in the present invention without departing from the scope and spirit of the invention. For example, specific shapes, quantities, and arrangements of various elements of the illustrated embodiments may be altered to suit particular applications. Moreover, various embodiments may be interchanged either in whole or in part, and it is intended that the present invention include such modifications and variations as come within the scope of the appended claims and their equivalents.

That which is claimed is:

1. A system for cutting a rolled product core comprising:
a laser configured for generating a laser beam;
a core guidance tube configured for receiving a rotating core moving at a translational speed in a machine direction from an upstream core winder, the core guidance tube further configured for exposing a portion of the rotating core to the laser beam;
a laser beam delivery system configured to direct the laser beam in a direction of the portion of the rotating core; and
a linear motion system configured to move the laser beam delivery system in the machine direction such that the rotating core is axially stationary to the laser beam delivery system as the laser beam is directed at the portion of the rotating core, the linear motor and the laser beam delivery system cooperable to cross-cut the rotating core transverse to the machine direction with the laser beam.

2. The system as in claim 1, wherein the laser is selected from the group consisting of a gas laser, a solid-state laser, a liquid laser, a chemical laser, a semiconductor laser, and combinations thereof.

3. The system as in claim 1, wherein the core guidance tube defines a core receiving end, a middle section and an expulsion end, the core receiving end having a larger inside diameter than an inside diameter of the middle section, the larger inside diameter of the core receiving end configured for guidingly receiving the core into the core guidance tube.

4. The system as in claim 3, wherein the core receiving end is substantially funnel-shaped.

5. The system as in claim 1, wherein the core guidance tube defines a slot therethrough, the slot disposed in a direction of the laser beam for exposing the portion of the rotating core to the laser beam.

6. The system as in claim 5, wherein the slot defines a length at least equal to a ratio of the translational speed divided by a rotational speed of the rotating core multiplied by a circumference of the rotating core.

7. The system as in claim 1, wherein the core guidance tube defines an access panel configured to access an interior of the core guidance tube.

8. The system as in claim 7, wherein the access panel is one of hingeably, swivelably, removably, and slidably attached to the core guidance tube.

9. The system as in claim 1, wherein the rotating core is made from a material selected from the group consisting of a cardboard, a fiberboard, a plastic, a paper, and combinations thereof.

10. The system as in claim 1, wherein the laser beam delivery system further comprises a reflector to translate the laser beam from the machine direction to the direction of the portion of the rotating core.

11. The system as in claim 1, wherein the linear motion system is selected from the group consisting of a servo-driven belt drive, an electromagnetic servo-drive, a cam shaft/follower system, a linear actuator, a ball-screw drive, a servo-pneumatic drive, and combinations thereof.

12. The system as in claim 1, wherein the linear motion system is configured for adjustable and variable speeds.

13. A system for cutting a core comprising:
a laser configured for generating a laser beam; and
a laser beam delivery system configured to direct the laser beam in a direction of a rotating core moving in a machine direction at a translational speed, the laser beam delivery system further configured to match the translational speed such that the rotating core is axially stationary relative to the laser beam delivery system, the laser beam configured to cross-cut the rotating core transverse to the machine direction such that the rotating core is severed by the laser beam.

14. The system as in claim 13, wherein the laser is selected from the group consisting of a gas laser, a solid-state laser, a liquid laser, a chemical laser, a semiconductor laser, and combinations thereof.

15. The system as in claim 13, wherein the laser beam delivery system further comprises a reflector to translate the laser beam from the machine direction to the direction of the rotating core.

16. The system as in claim 13, further comprising a core guidance tube configured for receiving the rotating core from an upstream core winder, the core guidance tube further configured for exposing a portion of the rotating core to the laser beam.

17. The system as in claim 16, wherein the core guidance tube defines a slot therethrough, the slot disposed in a direction of the laser beam for exposing the portion of the rotating core to the laser beam.

18. The system as in claim 17, wherein the slot defines a length at least equal to a ratio of the translational speed divided by a rotational speed of the rotating core multiplied by a circumference of the rotating core.

19. The system as in claim 16, wherein the core guidance tube defines an access panel configured to access an interior of the core guidance tube for one of a maintenance action, a core removal action, a cleaning action, and combinations thereof.

20. The system as in claim 19, wherein the access panel is one of hingeably, swivelably, removably, and slidably attached to the core guidance tube.

21. The system as in claim 13, further comprising a linear motion system selected from the group consisting of a servo-driven belt drive, an electromagnetic servo-drive, a cam shaft/follower system, a linear actuator, a ball-screw drive, a servo-pneumatic drive, and combinations thereof.

22. The system as in claim 21, wherein the laser beam delivery system is disposed on the linear motion system.

23. The system as in claim 21, wherein the linear motion system repositions the laser beam delivery system in the machine direction at the translational speed such that the rotating core is axially stationary relative to the laser beam delivery system, the linear motion system and the laser beam delivery system cooperable to cross-cut the rotating core transverse to the machine direction with the laser beam.

24. The system as in claim 13, further comprising a controller in communication with a proximity sensor, wherein the proximity sensor is disposed proximate the laser beam delivery system to sense a position of the laser beam delivery system, the proximity sensor configured to communicate the position to the controller, the controller configured to send a control signal to stop, start, or reverse the laser beam delivery system.

25. The system as in claim 24, wherein the laser is in communication with the controller, the laser configured to deactivate the laser beam when the proximity sensor senses the end point.

26. A method of cutting a core comprising the steps of:
a) providing a continuously forming and rotating core from an upstream core winder, the rotating core moving in a machine direction at a translational speed;
b) generating a laser beam;
c) receiving the laser beam in a laser beam delivery system proximate the rotating core;
d) moving the laser beam delivery system in the machine direction at the translational speed such that the rotating core is axially stationary relative to the laser beam delivery system; and
e) directing the laser beam at the rotating core with the laser beam delivery system such that the rotating core is circumferentially severed by the laser beam.

27. The method as in claim 26, further comprising the substep of receiving the continuously forming and rotating core in a core guidance tube from the upstream core winder, the core guidance tube configured for guiding the rotating core and exposing a portion of the rotating core to the laser beam.

28. The method as in claim 26, further comprising the step of deactivating the laser beam.

29. The system as in claim 26, wherein the laser beam delivery system is disposed on a linear motor.

30. The system as in claim 26, further comprising a linear motion system selected from the group consisting of a servo-driven belt drive, an electromagnetic servo-drive, a cam shaft/follower system, a linear actuator, a ball-screw drive, a servo-pneumatic drive, and combinations thereof.

31. The method as in claim 26, further comprising the step of discharging a section of the continuously forming and rotating core circumferentially severed by the laser beam.

32. The method as in claim 31, further comprising the step of removing the discharged section by one of a blower, a force of gravity, a discharge conveyor and combinations thereof.

* * * * *